Aug. 19, 1958     W. D. NOVAK     2,847,905

SOUND AND SLIDE PICTURE COORDINATION SYSTEM

Filed May 27, 1955     4 Sheets-Sheet 1

INVENTOR.
WARREN D. NOVAK

BY *H. A. Mackey*

ATTORNEY

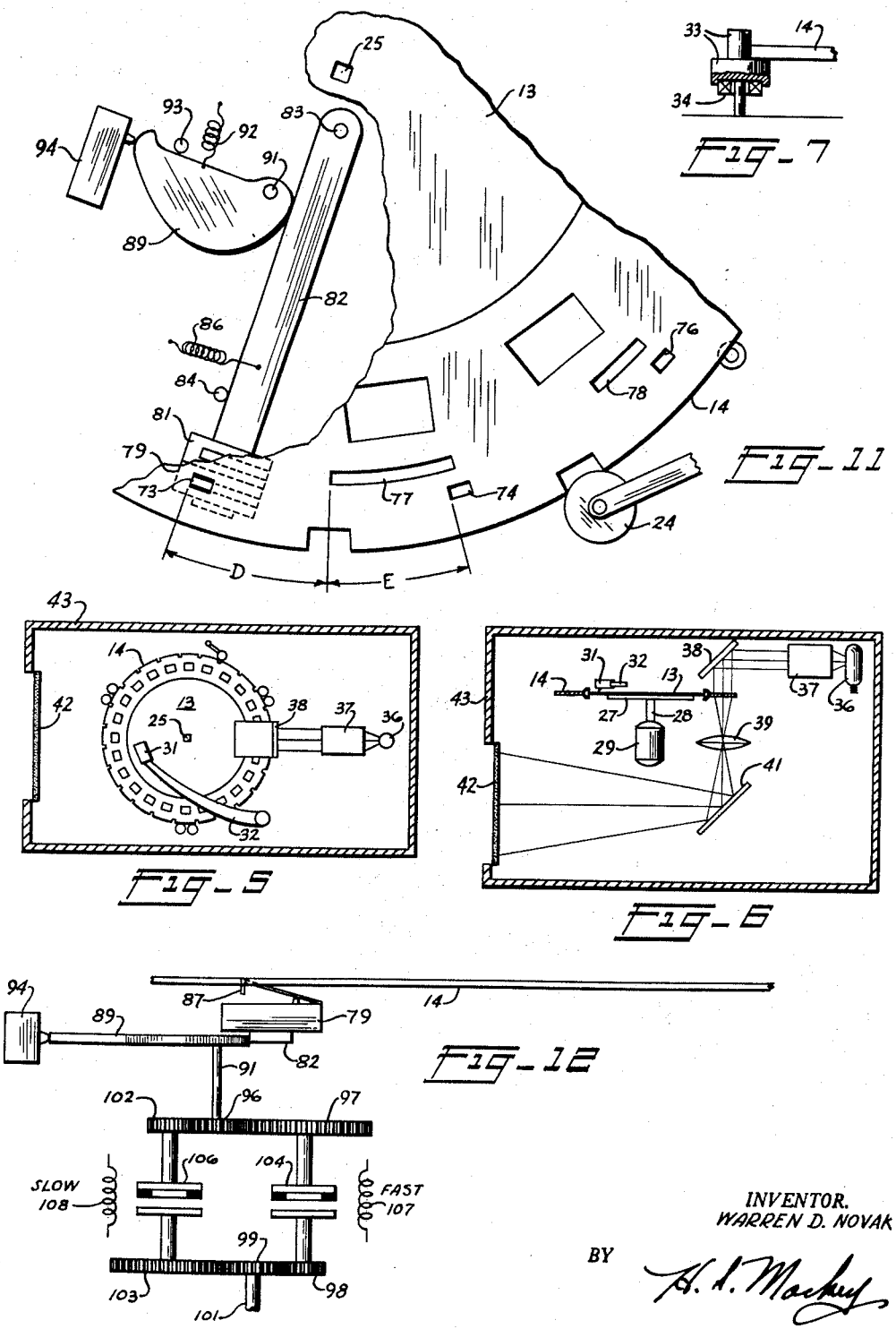

Aug. 19, 1958 W. D. NOVAK 2,847,905
SOUND AND SLIDE PICTURE COORDINATION SYSTEM
Filed May 27, 1955 4 Sheets-Sheet 3
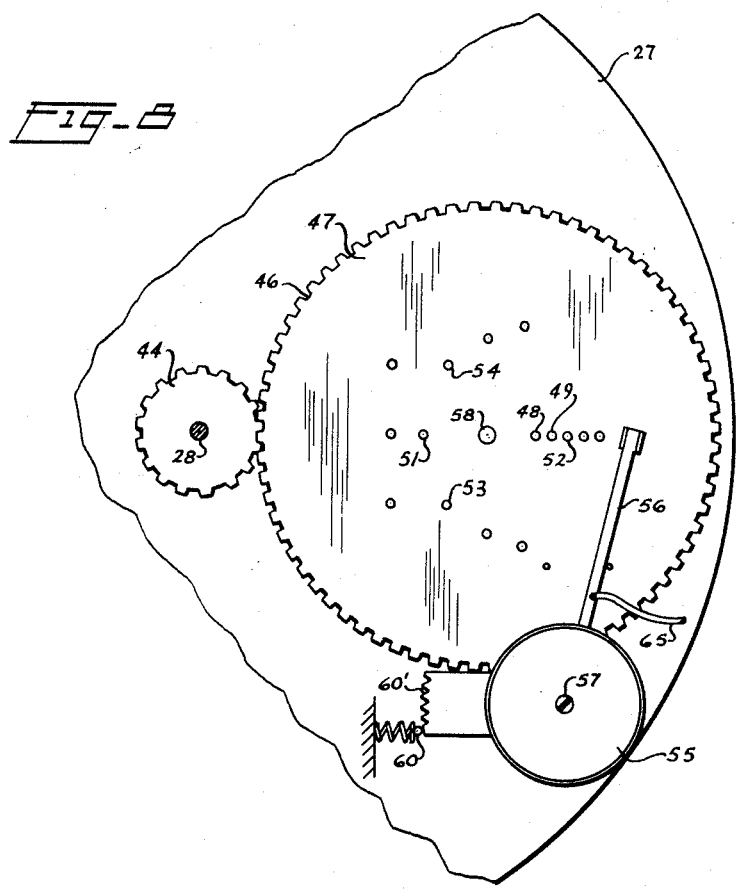
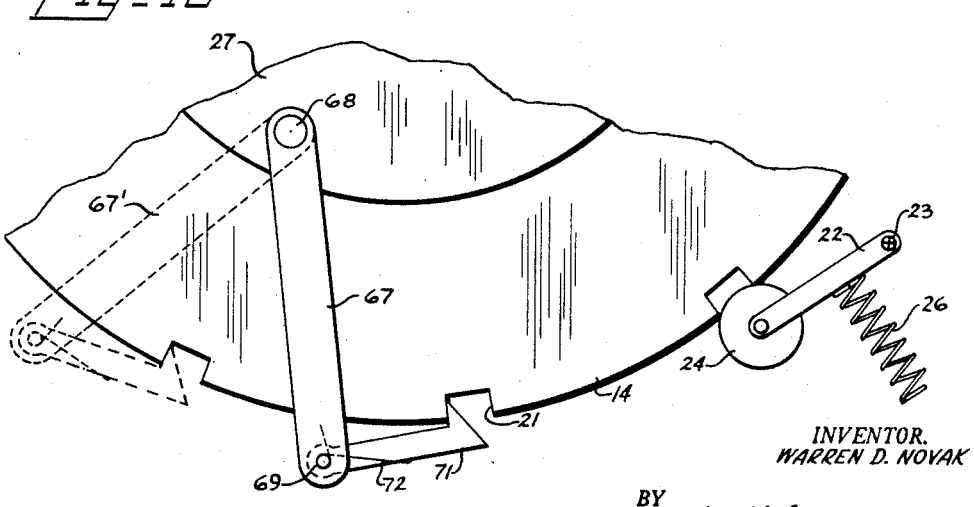
INVENTOR.
WARREN D. NOVAK
BY
ATTORNEY Aug. 19, 1958     W. D. NOVAK     2,847,905
SOUND AND SLIDE PICTURE COORDINATION SYSTEM
Filed May 27, 1955     4 Sheets-Sheet 4
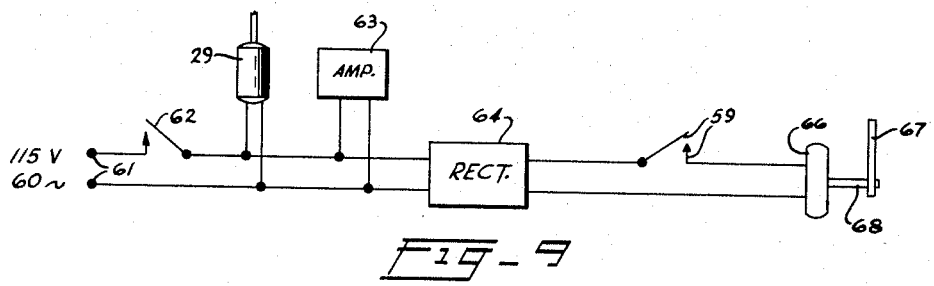
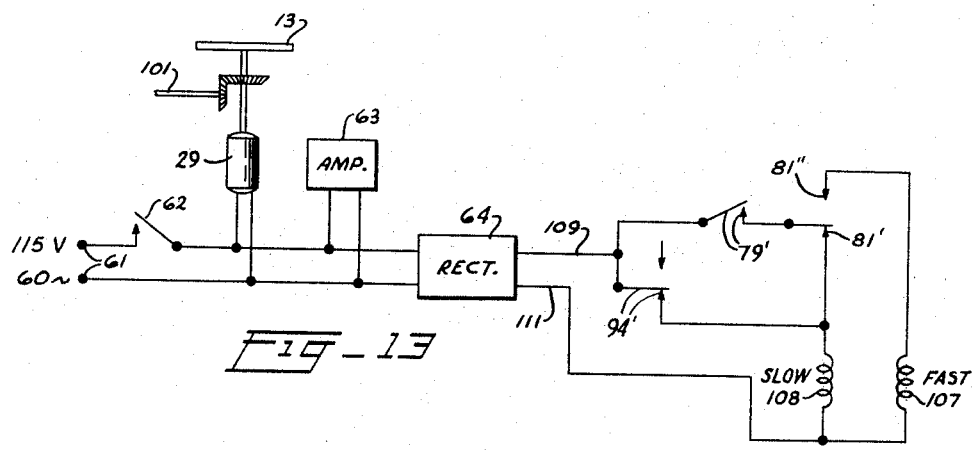
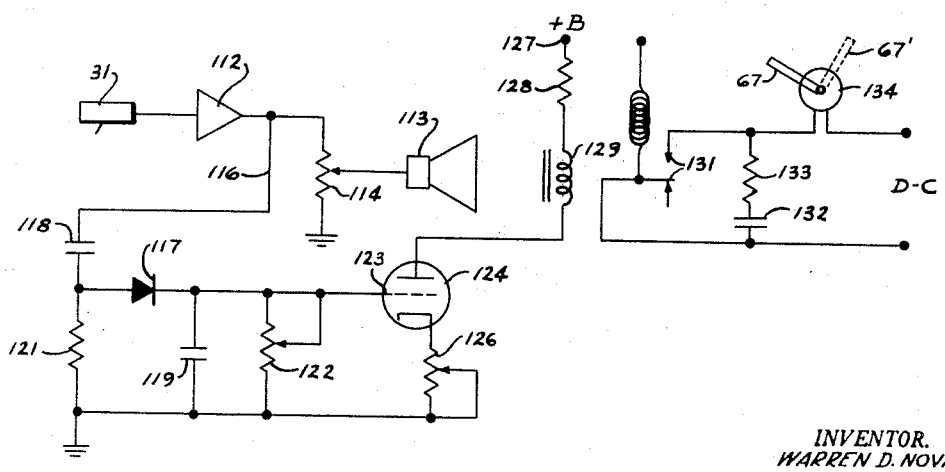
INVENTOR.
WARREN D. NOVAK
BY
ATTORNEY

United States Patent Office 2,847,905
Patented Aug. 19, 1958

2,847,905

SOUND AND SLIDE PICTURE COORDINATION SYSTEM

Warren D. Novak, Carmel, N. Y., assignor to General Precision Laboratory Incorporated, a corporation of New York Application May 27, 1955, Serial No. 511,569

4 Claims. (Cl. 88—27)

This invention relates to still picture projectors having accompanying sound. More specifically, the invention relates to pictures of the slide-film type accompanied by sound from an associated sound record, wherein the pictures are changed automatically in predetermined relation to the sound output.

The problem in such projectors is principally concerned with timing or synchronizing the sight and sound outputs so that their contents are properly coordinated to form a single audible and visible production. This production then enters the mind of the audience through the two senses of sight and hearing to form a single unified story impression therein. This can of course be done very well by employing motion picture techniques, but for some purposes a simpler system is desirable to eliminate the need for a motion picture projector. The problem is then reduced to the timing of the change from each still picture to the next one in accordance with the requirements of the audio record.

The simplest method of advancing the pictures employs equal, fixed time intervals. When the amount of the fixed time interval is nonadjustable and is the same for every sound record, such a system may be considered conventional. Its inflexibility makes it useless unless all of the sound records to be used with such a projector are prepared to synchronize with the picture projector.

A more useful and novel form of synchronization provides adjustment of the picture projection time interval, this interval being the same for all picture frames of any one picture record. The adjustment is under control of the projectionist, who sets it for each sound record in accordance with its requirements.

Another novel form of synchronization is controlled by code indicia accompanying the picture record so that each advance from one still picture to the next is in accordance with the code. The projection intervals in general then vary from frame to frame of a record in accordance with the requirements of the subject matter, and are in general different for each record.

Still another novel form of synchronization is controlled by code indicia accompanying the sound record. Such code indicia may, for example, consist of natural or edited pauses in the audio content of the sound record during which the sound output amplitude is zero or very small. By controlling sound record cutting so that these pauses of some length greater than a selected minimum occur when the picture is to be advanced, and at no other times, completely accurate synchronism is secured.

The present invention provides a sound record with amplifier, speaker and other audio parts; and a series of still pictures in a sequence forming a picture record, together with an optical projection system. The sound and picture records are mechanically interconnected so that they cannot be separated, yet can be independently run for reproduction in accordance with synchronization requirements. The sound record may be a disc, cylinder, magnetic wire, magnetic tape, optical track, or of any other type. As an example of the method of interconnection when the sound record is on a disc, the pictures may be transparencies placed in windows around a ring surrounding the disc. The ring and disc are locked together so that one cannot be removed from the other, yet so that each can be independently rotated. The invention also provides means for advancing the picture record one frame at a time in accordance with an automatic order signal, and provides code means for generating the order signal.

Both the sound record and the pictures composing the picture record are quite conventional in all respects except possibly in extra attention paid in editing the sound record when pause signals are to be generated. Therefore with respect to manufacture and in all mechanical details both the picture record and the sound record are completely standard and require no unusual manufacturing or commercial procedures.

The general purpose of this invention is to provide a still picture projector with accompanying coordinated sound.

Another purpose of this invention is to provide a sound projector for still pictures having the picture record and sound record locked inseparately together.

A further purpose of this invention is to provide a sound projector for still pictures employing a sound record and a picture record and advancing the picture record by means of a coded order signal.

A still further purpose of this invention is to provide a sound projector for still pictures having pictures advanced at equal intervals, the interval being adjustable in length.

Yet another purpose of this invention is to provide a sound projector for still pictures operating from records and having the pictures changed at unequal intervals in accordance with order signals from the records.

Further understanding of this invention may be secured from the detailed description and associated drawings, in which:

Figures 5 and 6 are schematic plan and elevation views of the sound picture projector enclosed in a cross-sectioned cabinet.

Figure 7 depicts a support for the picture record ring.

Figure 8 depicts a commutator for adjustably advancing the pictures at equal intervals.

Figure 9 depicts the circuit for adjustably advancing the pictures at equal intervals.

Figure 10 depicts a ratchet arrangement for advancing the picture record ring.

Figure 11 is a top view of a ratchet arrangement for advancing the picture record ring in time periods controlled by code perforations in the picture record ring.

Figure 12 depicts gear and clutch mechanism for use with the picture record ring code of Fig. 11.

Figure 13 is the schematic circuit for advancing the mechanisms of Figs. 11 and 12 at times controlled by the picture record ring code perforations.

Figure 14 is a schematic circuit for advancing the mechanism of Fig. 10 at times controlled by the times of pauses in the audio record.

Figure 1:
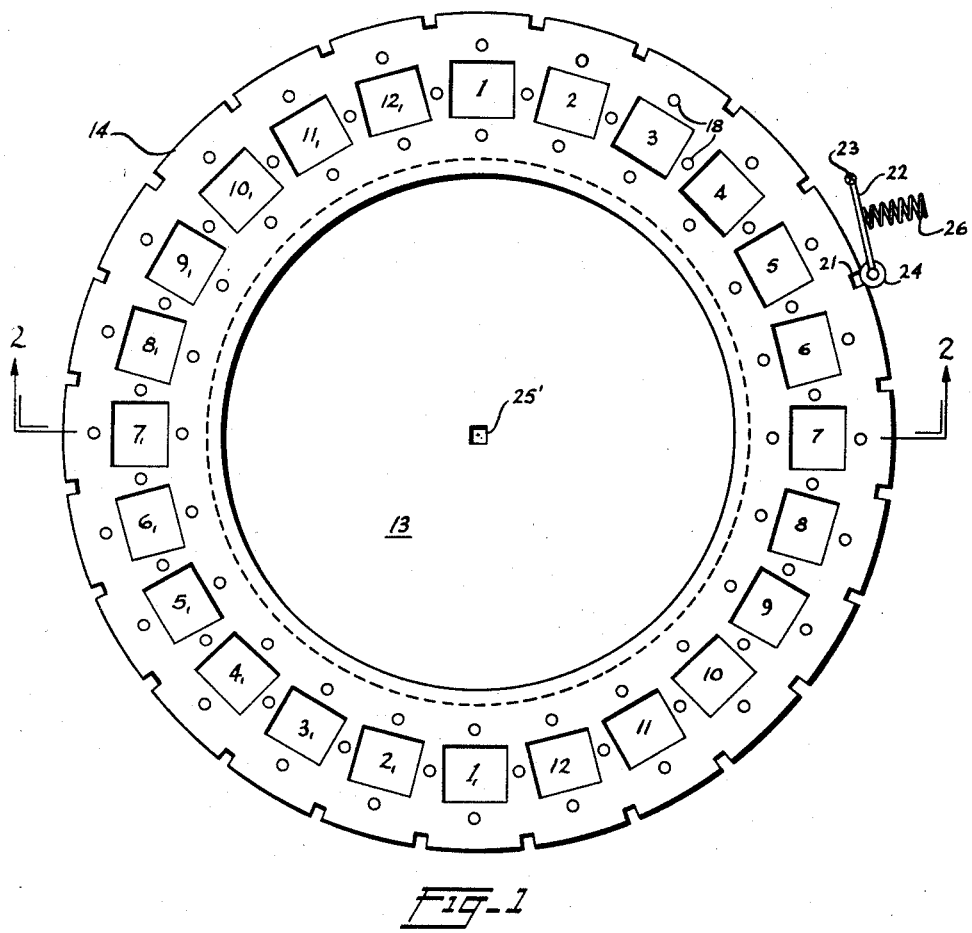
Figure 1 is a plan view of the composite record including the audio record disc and the picture record ring.
Figure 2:
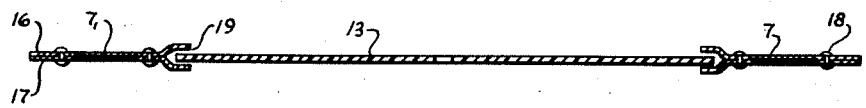
Figure 2 is a cross section of the composite record taken along the line 2—2 of Fig. 1.

Referring now to Figs. 1 and 2, a sound record disc 13 carries two sound records, one on each face. The nature of the sound material recorded thereon determines which one of the described methods of synchronization should be chosen or, phrased in another way, the sound and picture material for use with a particular method of synchronization must be suitable, and in some cases must be carefully edited to conform exactly to the method of synchronism employed.

For example, if the novel method first described be employed, in which all pictures are shown for equal lengths of time, the picture duration being adjustable, the story or other sound material must be set off into equal episodes, each episode consuming the same selected time, and that time must be set into the picture timing apparatus so that each picture change will occur at the instant required by the change of episode in the audio record.

If the second novel method be employed in which the several picture changes are initiated by code signals associated with the picture record, the several picture durations not necessarily being equal, any sound material may be employed without any editing whatever. However, it is necessary to review the audio material and to decide at what times during play it is desired to change pictures.

If the third novel method be employed in which picture changes are initiated by electrical order signals derived from pauses in the sound record, the latter must be carefully edited to introduce the pauses and to insure that other pauses normally occurring in the material are made to be of such short duration as not to generate order signals.

Figure 3:
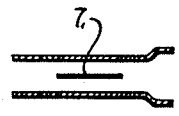
Figure 3 is an exploded view of one end of the cross sectional view of Fig. 2.

The sound record disc 13 is surrounded by a transparent acrylic plastic ring 14 which is made of two mating parts, 16 and 17. Each of these parts is the mirror image of the other and they are fastened together as by rivets 18. The two parts are offset at their inner edges to form an annular slot 19 loosely embracing the outer edge of disc 13. Twenty-four transparent pictures 1–12 and $1_1$–$12_1$ of identical size are imprisoned at equal intervals around the ring between its two mating parts. These pictures may conveniently have the size and nature of 35 mm. motion picture positive film, but are not restricted thereto, any other size, character and number of transparencies which can be secured to the ring 14 being suitable. The association of parts is depicted in the exploded drawing Fig. 3. Half of the pictures, covering 180° of the ring, are for use with one side of the disc and are to be illuminated by light emanating from that side of the disc. The remaining pictures, covering the remaining 180° of the ring, are for use with the other side of the sound record and are reversed. For example, when the upper side of the disc 13, Fig. 2, is in use the light source is above and shines downward through picture 7, but when the disc and ring are reversed, the light source above shines downward through the reversed picture $7_1$. Thus the light source sides of pictures 1–12 face in one direction as installed in the ring and the light source sides of pictures $1_1$–$12_1$, as installed, face in the opposite direction.

In place of the double-sided record disc a single-sided record disc may be employed, in which case all of the transparencies in the picture recording face the same way and the entire circumference of the ring is available for use as the picture accompaniment to one side of the sound record.

Figure 4:
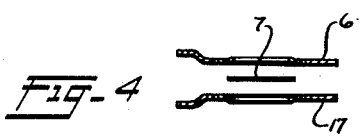
Figure 4 is an exploded cross section of a section of the composite record showing details of design when the picture record ring is made of stamped metal.

The mating parts of ring 14 may be made of thin metal or opaque plastic with windows cut for the transparencies, instead of transparent plastic, as indicated in Fig. 4. Recesses may be stamped into the rings 16 and 17 to receive the transparencies, or a filler sheet may be inserted between the two mating parts, this sheet having the thickness of the transparencies.

The ring 14 is provided with a series of identical notches, such as notch 21, in its periphery for the purpose of stopping and locking the ring precisely at each picture position. These notches may be V-shaped or preferably rectangular as shown, for a reason which will appear.

A detent arm 22 pivoted at pin 23 is provided with a roller 24 pressed against the edge of the ring by a spring 26, so that as the ring turns the roller drops into a notch, holding the ring at an exact angular position. When sufficient force is applied to the ring the roller 24 is forced out of its notch and rolls on the smooth edge of the disc to the next notch.

The composite record consisting of the sound disc record 13 and the picture ring record 14 is preferably combined with audio amplifying and speaking equipment and with optical projection equipment, all contained in a single unit, to form a self-contained sound projector for still pictures. This unit is generally depicted in Figs. 5 and 6. The sound record 13, Fig. 6, is supported and driven by a turntable 27 which is rotated by spindle 28 and motor 29. The drive of the sound record is made positive for example by the use of a square turntable spindle 25 which fits into a square hole 25' in the center of the record disc. The sound record is provided with an electrical pickup 31 and pickup arm 32.

The picture ring record 14 is supported on three pairs of antifriction supports so designed as to preserve concentricity and coplanarity with the sound disc. These alignments are accurate enough that little or no rubbing occurs between the outer rim of the sound disc and the inner slotted portion of the picture ring embracing the sound disc. One such ring support is depicted in cross section in Fig. 7, showing a support spool 33 and a ball bearing 34. Further reduction of friction may be secured by the use of two antifriction bearings, one to take the horizontal load and one the vertical. The spools are placed in pairs so that when as few as three pairs are used, the notches 21 will not interfere with their functioning. If however, spools are placed at five or more equidistant locations they need not be paired. To minimize friction in the event that rubbing occurs the inner surfaces of the flange ring or the edge surfaces of the audio record disc, or both, may be faced with low-friction material.

The optical system includes a projection lamp 36, collimating lens 37 and a right-angle prism or mirror 38. The light beam is directed thereby downward through a transparency held in ring 14 to pass through the projection lens system represented by lens 39. The beam is again bent through a right angle by prism or mirror 41 so that it is directed horizontally to fall on the vertical frosted glass screen 42. This screen is set in the front of a box or cabinet 43 enclosing the entire device. Alternatively a Fresnel lens type of translucent screen providing wide-angle viewing may be employed if desired.

Mechanism for advancing the pictures at adjustable equal intervals is shown in Fig. 8. A pinion 44 is positioned below the turntable 27, Figs. 6 and 8, and is secured to the turntable shaft 28 for rotation thereby. A gear 46 is meshed with pinion 44.

An insulating disc 47 is secured to gear 46 and carries several concentric rings of contacts. For example, the innermost ring of contacts contains but one contact point 48, the next ring of contacts contains two contact points 49 and 51 spaced at 180°, and the next ring of contacts contains three contact points 52, 53 and 54, equally spaced at 120° around its ring. Thus in successive concentric ring locations there are one, two, three, etc. numbers of equally spaced contacts, the largest number shown being five, although the commutator of the invention is not limited to such number. A contact arm 56 is pivoted at screw 57 so that it may be swung by means of a manual knob 55, in an arc to make contact with any one of the rings of contacts. A ball detent 60 cooperating with notches 60' detains the arm at the contact positions. Thus any number of contacts, $mn$, per revolution of the sound record disc may be closed at equal intervals, $m$ being the ratio of the number of teeth in pinion 44 to the number of teeth in gear 46, and $n$ being the number of contact points in the circle contacted by arm 56. The circuit is completed by a fixed brush, not shown, pressing against a central contact 58 electrically connected to all of the other contacts. Current is led to arm 56 through conductor 65.

In the electrical circuit of Fig. 9 for advancing the pictures at adjustable equal intervals the commutator of Fig. 8 is represented by switch 59 for simplicity of illustration. Alternating current is applied from terminals 61 through an on-off switch 62 to the turntable motor 29, the audio amplifier 63 and a direct-current power supply rectifier 64. The direct-current output of this rectifier is applied through switch 59 to a rotary solenoid 66.

This solenoid 66 furnishes the mechanical power for advancing the picture record as depicted in Fig. 10. An arm 67 pivoted to the frame by a pin 68 is positioned horizontally beneath the turntable 27 so that it projects beyond the periphery of the picture ring 14. The periphery of this ring as heretofore stated is provided with rectangular notches 21 and a detent 24 is associated therewith. The arm 67 is rotated through pin 68 by the rotary solenoid 66, Fig. 9, and the arm 67 is provided with a pin extension 69 on its outer end which in turn carries a pawl 71. This pawl is positioned in the plane of the picture ring and has a hooked end designed to latch into the notches 21. The pawl is pressed against the periphery of the picture ring by a spring 72, so that as it is moved toward the right by arm 67 it may drop into one of the notches 21.

In operation, when contacts 59 close, energizing solenoid 66, arm 67 is rotated clockwise thereby by the angular distance between notches, stopping at the dashed position 67', and advancing the picture ring by one picture. When the solenoid is deenergized a self-contained retractile spring returns the arm 67 to the position shown in full lines.

When the pictures are to be advanced at nonadjustable intervals which may be unequal the picture ring periphery carries a punched code which must be prepared in advance in accordance with the requirements of the audio material on the sound record. The punched code occupies two concentric ring positions just within the outer edge of the picture ring for use with a one-sided sound record disc, four concentric ring positions being required for use with double-sided records.

Two such rings of code slots are depicted in Fig. 11. One ring comprises short slots such as slots 73, 74 and 76, spaced at equal angles equal to the picture record spacing. The other ring comprises long slots such as slots 77 and 78. The timing of each picture is determined by the distance between the left end of the associated short slot and the left end of the associated long slot, such as distance D. Two short-travel electric snap switches 79 and 81 are carried by a timing arm 82 pivoted at pin 83 secured to the frame. The arm 82 is held against a stop 84 by a retractile spring 86. The switches 79 and 81 are provided with similar latching levers, one of them, 87, being visible in Fig. 12. The switches are so positioned that their latching levers are beneath the rings of code slots, and rotation of the arm 82 carrying the switches moves them substantially along the code rings, the pivot pin 83 being near the record shaft 25. Alternatively, arm 82 may be pivoted on a round collar on the record shaft 25 itself. A spiral cam 89 is secured to a shaft 91 so positioned that the cam bears on one edge of arm 82. The spiral cam is preferably of such form that as shaft 91 is rotated, movement of arm 82 is linearly proportional to shaft 91 rotation. The shaft and cam are provided with a retractile spring 92 urging the cam against a stop 93. A short-travel snap switch 94 is operated when the cam is in its fully retracted position against stop 93.

The cam shaft 91, Fig. 12, is rotated from the turntable motor through two alternative sets of gears. One set, consisting of gears 96, 97, 98 and 99, rotates the shaft 91 from the motor take-off shaft 101 at a relatively high speed and the other set of gears 96, 102, 103 and 99 rotates the shaft 91 at a relatively low speed. Two clutches, 104 and 106, are interposed in the two gear trains and are operated electrically as indicated schematically by the coils 107 and 108.

The circuit of this code advance device is schematically depicted in Fig. 13, power being applied to either the slow clutch operating coil 108 or the fast coil 107 under control of the switch contacts. Contacts 79' are the contacts of switch 79, Figs. 11 and 12 and are open as drawn when the latch lever 87 projects into one of the slots such as slot 73. Contacts 81' and 81'', Fig. 13, are the contacts of switch 81, Fig. 11, and contact 81' is closed when the latch lever of switch 81, having the form of latch lever 87, does not project into a slot but is pressed down by pressure of the lower surface of the record ring. Contact 81'' is closed when the latch lever projects into a slot such as slot 77. Contacts 94' of switch 94, Figs. 11 and 12, are closed when the cam 89 is in position as drawn to press against the switch 94.

In the operation of this circuit and apparatus for advancing the pictures at selected intervals let it be supposed that a picture has just been positioned. Then, at the beginning of the projection time period cam 89 is against its stop 93 and contacts 94' are closed thereby. Switch 79 is in slot 73 and its contacts 79' therefore are open. Switch 81 is not in any slot and therefore its contact arm is in the down position and closes contact 81'. The rectified output of rectifier 64 is applied through conductors 109 and 111 and switch contacts 94' to the slow coil 108. This coil operates clutch 106, connecting shaft 101 through gears 103 and 102 to drive shaft 91 and cam 89. This cam forces arm 82, Fig. 11, to rotate slowly counterclockwise about its pivot 83, so that the latch arm 87 is forced out of opening 73, closing contacts 79'. The picture ring 14 is kept from turning by its detent 24. As cam 89 leaves switch 94 its contacts 94' are opened but the circuit through the slow coil 108 is maintained through contacts 79' and 81'. The arm 82 carrying switches 79 and 81 travels through the distance D until the latch of switch 81 drops into the slot 77, opening contact 81' and closing contact 81''. This transfers operation from the slow coil 108 to the fast coil 107, accordingly transferring the drive of shaft 91 from gears 102/103 to gears 97/98. This causes the arm 82 to move much faster, so that the distance E, Fig. 11, is covered in a period of time which is so short as to be negligible compared to the period required to cover distance D. This fast motion is terminated when the latch arm 87 of switch 79 drops into slot 74, opening contacts 79'. This removes power from the clutch coil 107, opening clutch 104. As clutch 106 is also open at this time, the cam 89 is free to return to its stop 93 under the pull of its retractile spring 92, permitting arm 82 also to be retracted by spring 86 to its stop 84. As the arm 82 is thus retracted, the latch 87 of switch 79 latches against the left edge of opening 74, so that the picture record ring 14 is rotated clockwise until slot 74 is in the position formerly occupied by slot 73. As cam 89 reaches its stop 93 switch contacts 94' close, again closing the circuit through the slow cltuch coil 108, closing clutch 106 and again starting the arm 82 moving counterclockwise. The latch lever of switch 81 now leaves slot 77 opening contact 81'' and closing contact 81' so that, when contacts 79' close and contacts 94' open, the slow rate of rotation of arm 82 is maintained.

The described cycle of operation now is repeated at each set of slots, the time for each cycle being substantially controlled only by the distance D, which may be different for each picture.

The third method of advancing the picture record ring requires pauses edited into the sound record, as before mentioned, and employs the mechanism of Fig. 10 in association with the circuit of Fig. 14. The phonograph pickup 31 is connected to an audio amplifier 112 followed by a speaker 113. A volume control 114 is inserted ahead of the speaker since a volume control at the usual position ahead of the amplifier would interfere with the automatic operation. A pause signal takeoff conductor 116 is connected to the amplifier output ahead of the volume control. This conductor applies the audio output to a rectifier comprising rectifier 117, capacitors 118 and 119 and resistor 121. The rectified output is applied to a shunt rheostat 122 and to the control grid 123 of a triode 124 having adjustable bias cathode rheostat 126. The anode potential is supplied from source terminal 127 through a limiting resistor 128 and winding 129 of a sensitive relay having normally closed contacts 131. These contacts are provided with a spark killer circuit consisting of capacitor 132 and resistor 133 in series and, when closed, apply direct current power to a rotary solenoid 134. The arm 67 of this rotary soleoid is shown in solid lines in the deenergized position and in dashed lines 67' in the energized position. The mechanical connections to this arm 67 are as shown in Fig. 10.

In the operation of this circuit, during reception by the rectifier 117 of the audio frequency output of the amplifier 112 without pauses or with pauses having a duration of less than a selected amount such as, for example, of three-fourths second, the rectified audio voltage is integrated by the circuit consisting of capacitor 119 and rheostat 122. The time constant of this circuit is adjustable and is assumed to be set at three-fourths second. The positive potential applied to control grid 123, when appropriate bias is employed, is therefore continuous and does not permit the anode current of triode 124 to fall below a selected value. This value is the release value of relay coil 129, so that the relay is continuously in the operated condition, keeping contacts 131 open and solenoid 134 in its normal position. When, however, a pause of three-fourth second or longer occurs, constituting a signal to change the picture, the positive potential on control grid 123 decays so that anode relay releases, closing contacts 131. This operates rotary solenoid 134 so that its arm 67, Fig. 10, rotates to the dashed position 67', rotating the picture ring and advancing it by one picture position. At the end of the pause the control grid 123, Fig. 14, is again made positive, causing increased anode current to flow, operating the relay and permitting the rotary solenoid arm 67 to be retracted to its full line position.

In place of the flat sound record disc and the flat coplanar picture record ring, either or both may be in strip form without departing from the spirit of the invention. In all cases the audio and picture records, or the reels therefor are locked together, and any of the described three methods of operation may be employed. The duration of the play and the number of pictures, and the length of audio record may thus be substantially increased.

What is claimed is:

1. A sound and image projector comprising, a sound reproducer, an image projector, a composite sound and image record associated with said reproducer and projector consisting of a sound disc record and an image record having a plurality of image frames carried thereby irremovably secured to said sound disc record but independently rotatable with respect thereto, code indicia carried by said image record and located adjacent the image frames thereof, means controlled by said indicia for determining the duration of projection of each image frame, and means including said indicia for advancing said image record to project succeeding image frames.

2. A sound and image projector comprising, a sound reproducer, an image projector, a composite sound and image record associated with said reproducer and projector consisting of a sound disc record and an annular image record circumscribing said disc record and rotatably secured to the periphery thereof, said annular image record having a plurality of image frames annularly spaced thereon, timing indicia carried by said image record, means controlled by said timing indicia for determining the duration of projection of each image frame, and means including said indicia for advancing said image record from frame to frame.

3. A sound and image projector comprising, a sound reproducer, an image projector, a composite sound and image record associated with said reproducer and projector consisting of a sound disc record surrounded by an annular image record rotatably secured to the periphery thereof, a plurality of picture frames mounted on said image record and annularly spaced thereon, indicia apertures formed in said image record and disposed in concentric circles adjacent said picture frames, a timing arm, means for conjointly driving said sound disc and said timing arm, switch means carried by said timing arm and positioned to be actuated by said indicia apertures and means including said switch means for advancing said image record.

4. A sound and image projector comprising, a sound reproducer, an image projector, a composite sound and image record associated with said reproducer and projector consisting of a sound disc record surrounded by an annular image record rotatably secured to the periphery thereof, said image record having a plurality of annularly spaced apart picture frames mounted thereon, indicia apertures formed in said annular image record, said apertures being disposed in two concentric circles about said image record adjacent said picture frames, a timing arm, a first switch carried by said timing arm ment of one of said switch means with one of said concentric circles, a second switch carried by said timing arm positioned to be engaged by the indicia of the other of said concentric circles, means actuated by the disengagement of both of said switch means for driving said arm in one direction relative to said image record at a first selected speed, means actuated by the engagement of one of said switch means with one of said cooperating apertures for driving said arm at a second higher selected speed and means actuated by the engagement of both of said switch means with their respective cooperating apertures establishing a driving connection between said arm and said image record and for advancing said image record.

References Cited in the file of this patent

UNITED STATES PATENTS

| 745,218 | Mensing | Nov. 24, 1903 |
| 2,279,119 | Freimann | Apr. 7, 1942 |
| 2,346,905 | Chedister | Apr. 18, 1944 |
| 2,587,433 | Bentley et al. | Feb. 26, 1952 |
| 2,618,197 | Boushey | Nov. 18, 1952 |
| 2,647,437 | Bentley et al. | Aug. 4, 1953 |
| 2,683,390 | Steele | July 13, 1954 |